US008832854B1

(12) United States Patent
Staddon et al.

(10) Patent No.: US 8,832,854 B1
(45) Date of Patent: Sep. 9, 2014

(54) SYSTEM AND METHOD FOR PRIVACY SETTING DIFFERENTIATION DETECTION (75) Inventors: Jessica Staddon, Redwood City, CA (US); Jonathan S. McPhie, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/173,359

(22) Filed: Jun. 30, 2011

(51) Int. Cl.
*H04L 29/06* (2006.01)
*G06F 21/00* (2013.01)

(52) U.S. Cl.
USPC ............................................ 726/28; 705/319

(58) Field of Classification Search
None
See application file for complete search history.

(56) References Cited

U.S. PATENT DOCUMENTS

| | | | |
|---|---|---|---|
| 6,130,938 A | 10/2000 | Erb | |
| 6,192,119 B1 | 2/2001 | Wilson | |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,555,110 B2 | 6/2009 | Dolan et al. | |
| 7,610,287 B1 | 10/2009 | Dean et al. | |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0056475 A1 | 3/2008 | Brannick et al. | |
| 2008/0192656 A1 | 8/2008 | Vagelos | |
| 2009/0171964 A1* | 7/2009 | Eberstadt et al. | ................. 707/9 |
| 2011/0098156 A1 | 4/2011 | Ng et al. | |

FOREIGN PATENT DOCUMENTS

WO   WO0279984   10/2002

OTHER PUBLICATIONS

Adamic et al., "A Social Network Caught in the Web," Internet Journal, First Monday, Jun. 2, 2003, vol. 8, No. 6, pp. 1-22.
Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

(Continued)

*Primary Examiner* — Gilberto Barron, Jr.
*Assistant Examiner* — Simon Kanaan
(74) *Attorney, Agent, or Firm* — Patent Law Works LLP (57) ABSTRACT

A system and method for generating a notification of privacy settings difference is disclosed. A request is received. A first set of privacy settings is received from a first social network, and a second set of privacy settings is received from at least one other social network. The first set of is compared to the second set. A difference between the first set and the second is detected, and a notification is generated. The notification includes an indication that a difference was detected. The notification is sent for display to the user. In one embodiment, the notification allows the user to request to view, or edit, the first set of privacy settings. In one embodiment, the notification sends the user to a webpage on the first social network where the first set is typically displayed and/or edited. In another embodiment, the notification displays the first set and/or receives the edits.

27 Claims, 7 Drawing Sheets

(56) References Cited

OTHER PUBLICATIONS

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

My Social Network          702

WARNING! This Social Network Uses Different Privacy Settings Than One or More of Your Other Social Networks.  703

Detected Privacy Settings Differences:  704

| Feature | First Social Network's Setting | Other Social Network 1's Setting | Other Social Network 2's Setting |
|---|---|---|---|
| First/Last Name | Public | Friends of Friends | Public |
| Gender | Friends | Public | Public |
| Age | Me Only | Friends | Friends |
| Photos | Public | Friends | |
| Residential Address | Public | Me Only | Me Only |
| ••• | ••• | ••• | ••• |

Figure 7

SYSTEM AND METHOD FOR PRIVACY SETTING DIFFERENTIATION DETECTION

The specification relates to social networks. In particular, the present specification relates to privacy settings on social networks. The present specification also relates to generating and sending a notification to a first social network user when the user's privacy settings of the first social network differ from the user's privacy settings in at least one other social network.

BACKGROUND

Social networks are becoming an increasingly popular way for people to stay connected. This increasing popularity of social networks has given rise to social network services that have developed various ways users of the social network can communicate and share information. Users within a social network can send each other messages, view other users' activities and share personal information, including personal photographs and videos. Social networking services can provide a forum for users to remain in close contact despite geographic distance or uncoordinated schedules. Social network users are typically able to adjust the amount and type of information they choose to share and how and with whom that information is shared. However, for users belonging to multiple social networks, it may be difficult for the users to monitor the privacy settings of each social network, remember the different privacy settings of each social network, or even realize that each social network's privacy settings are different.

SUMMARY OF THE INVENTION

The deficiencies and limitations of the prior art at least in part are overcome by providing a system and method for notifying a first social network user when one or more of the user's privacy settings differ from the user's privacy settings in at least one other social network.

A system and method are provided for generating a notification of privacy settings difference. In one embodiment the system includes a request receiver engine, privacy settings retrieval engine, privacy settings differentiator engine, differentiation display engine and an optional privacy settings adjustment engine. The request receiver engine for receives a request. The privacy settings retrieval engine receives a first set of privacy settings of a user from a first social network and a second set of privacy settings of the user from at least one other social network. The privacy settings differentiator engine compares the privacy settings of the first social network to those of the of the at least one other social network and, responsive to detecting a difference between the first set of privacy settings and the second set of privacy settings, prompts the differentiation display engine to generate a notification. The notification is sent to the user for display and includes an indication that the difference has been detected.

In one embodiment, the request is the user's login request that is sent to the first social network. In another embodiment, the request is the user's request to edit one or more privacy settings of the first social network. In yet another embodiment, the request is the user selecting a button or hypertext link on the first social network. In one embodiment, the difference exists when the privacy setting of the first set of privacy settings is less restrictive than the privacy setting of the second set of privacy settings.

The notification may include a variety of information and features. In one embodiment, the notification identifies at least one other social network having the detected difference from the first social network. In another embodiment, the notification includes the detected difference between the first set of privacy settings and the second set of privacy settings. In one embodiment, the notification allows the user to request to view, or edit, one or more of the privacy settings of the first social network. In one such embodiment, the privacy settings adjustment engine receives the user's request to view, or edit, the privacy settings of the first social network; and sends the user to a webpage on the first social network where the privacy settings are typically displayed, or edited. In another such embodiment, the privacy settings adjustment module receives the user's request to edit and one or more edits to the user's privacy settings of the first social network; and updates the privacy settings of the first social network according to the edits received from the user.

BRIEF DESCRIPTION OF THE DRAWINGS

The embodiments are illustrated by way of example, and not by way of limitation in the figures of the accompanying drawings in which like reference numerals are used to refer to similar elements.

FIG. 7 is a graphic representation of another example of a user interface displaying a notification to the first social network user that one or more of the user's privacy settings differ from the user's privacy settings on at least one other social network according to another embodiment.

DETAILED DESCRIPTION

A system and method for notifying a first social network user when one or more of the user's privacy settings differ from the user's privacy settings of at least one other social network is described. In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. For example, the present embodiments are described in one embodiment below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "comparing" or identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, one embodiment can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

System Overview

Figure 1:
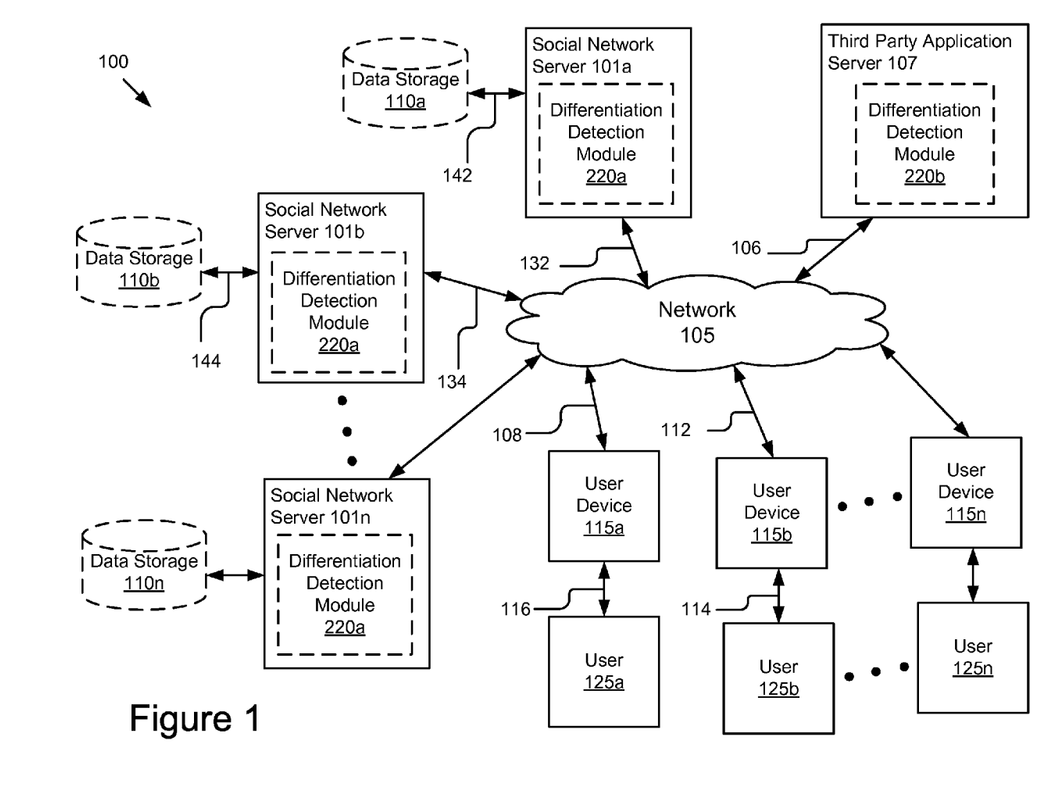
FIG. 1 illustrates a block diagram of a system for notifying a first social network user when one or more of the user's privacy settings differ from the user's privacy settings in at least one other social network according to one embodiment.

FIG. 1 illustrates a block diagram of a system 100 for notifying a first social network user when one or more of the user's privacy settings differ from the user's privacy settings on at least one other social network according to one embodiment. The illustrated embodiment of the system 100 for notifying a first social network user when one or more of the user's privacy settings differ from the user's privacy settings on at least one other social network includes user devices 115a, 115b, 115n that are accessed by users 125a, 125b, 125n and a third party server 107. The system 100 also includes social network servers 101a, 101b, 101n. In the illustrated embodiment, these entities are communicatively coupled via a network 105. Although only three devices are illustrated, persons of ordinary skill in the art will recognize that any number of user devices 115n are available to any number of users 125n. Further, although only three servers 101a, 101b, 101n are illustrated, persons of ordinary skill in the art will recognize that any number of social network servers 101n are available.

The user devices 115a, 115b, 115n and social network servers 101a, 101b, 101n in FIG. 1 are used by way of example. While FIG. 1 illustrates three devices, the present embodiment applies to any system architecture having one or more user devices and one or more social network servers associated with two or more social networks. Furthermore, while only one network 105 is coupled to the user devices, 115a, 115b, 115n, the social network servers 101a, 101b, 101n, and the third party server 107, in practice any number of networks 105 can be connected to the entities. Furthermore, while only one third party application server 107 is shown, the system 100 could include one or more third party application servers 107.

In one embodiment, the social network server 101a/101b/101n also contains a social network module 209. A social network is any type of social structure where the users are connected by a common feature. Examples include, but are not limited to, Orkut, Buzz, blogs, microblogs, and Internet forums. The common feature includes friendship, family, a common interest, etc. The common feature includes friendship, family, work, an interest, etc. Although a person of ordinary skill in the art will recognize that a social network can comprise one or more social network servers 101a, 101b, 101n, for the purposes of describing the components and functionality of the system 100, the below description describes the system 100 where each social network server 101a/101b/101n belongs to and represents a different social network.

The network 105 enables communications between the user devices 115a, 115b, 115n, the social network servers 101a, 101b, 101n, and the third party application server 107. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 105 can also include links to other networks.

In one embodiment, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial—or satellite-based transceivers). In one embodiment, the network 105 is an IP-based wide or metropolitan area network.

In some embodiments, the network 105 helps to form a set of online relationships between users 125a, 125b, 125n, such as provided by one or more social networking systems including explicitly-defined relationships and relationships implied by social connections with other online users, where the relationships form a social graph. In some examples, the social graph can reflect a mapping of these users and how they are related.

In one embodiment, a differentiation detection module 220a is included in the social network server 101a/101b/101n and is operable on the social network server 101a/101b/101n. In another embodiment, the differentiation detection module 220b is included in the third party application server 107 and is operable on the third party application server 107. Persons of ordinary skill in the art will recognize that the differentiation detection module 220a/220b can be stored in any combination on the devices and servers. In some embodiments the differentiation detection module 220a/220b includes multiple, distributed modules that cooperate with each other to perform the functions described below. Details describing the functionality and components of the differentiation detection module 220a of the social network server 101a/101b/101n are explained in further detail below with regard to FIG. 3.

In the illustrated embodiment, the user devices 115a, 115b are coupled to the network 105 via signal lines 108 and 112, respectively. The user 125a is communicatively coupled to the user device 115a via signal line 116. Similarly, the user 125b is communicatively coupled to the user device 115b via signal line 114. The third party application 107 is communicatively coupled to the network 105 via signal line 106. The social network servers 101a, 101b, are coupled to the network 105 via signal lines 132, 134, respectively. In one embodiment, the social network servers 101a, 101b are each communicatively coupled to a data storage device 110a/110b via a signal line 142/144, respectively.

In one embodiment, data storage 110a/110b/110n stores data and information of users 125a, 125b, 125n of the social network 101a/101b/101n. Such stored information includes user profiles and other information identifying each user 125a/125b/125n of the social network 101a/101b/101n. Examples of information identifying users includes, but is not limited to, the user's name, contact information, sex, relationship status, likes, interests, links, education and employment history, location, political views, and religion. In one embodiment, the information stored in data storage 110a/110b/110n also includes the user's list of current and past friends and the user's activities within the social network 101a/101b/101n, such as anything the user posts within the social network 101a/101b/101n and any messages that the user sends to other social network 101a/101b/101n users. In one embodiment, the data and information stored by the data storage 110a/110b/110n includes the user's 125a/125b/125n privacy settings. In another embodiment, which is discussed below, a storage device 214 (see FIG. 2) is included in the social network server 101a/101b/101n and the storage device 214 stores the data and information of the users 125a, 125b, 125n of the social network 101a/101b/101n discussed in relation to the data storage 110a/110b/110n.

In one embodiment, the user device 115a, 115b, 115n is an electronic device having a web browser for interacting with one or more social network servers 101a, 101b, 101n via the network 105 and is used by user 125a, 125b, 125n to access information in the system 100. The user device 115a, 115b, 115n can be, for example, a laptop computer, a desktop computer, a tablet computer, a mobile telephone, a personal digital assistant (PDA), a mobile email device, a portable game player, a portable music player, a portable music player, or any other electronic device capable of accessing a network.

Social Network Server 101a/101b/101n

Figure 2:
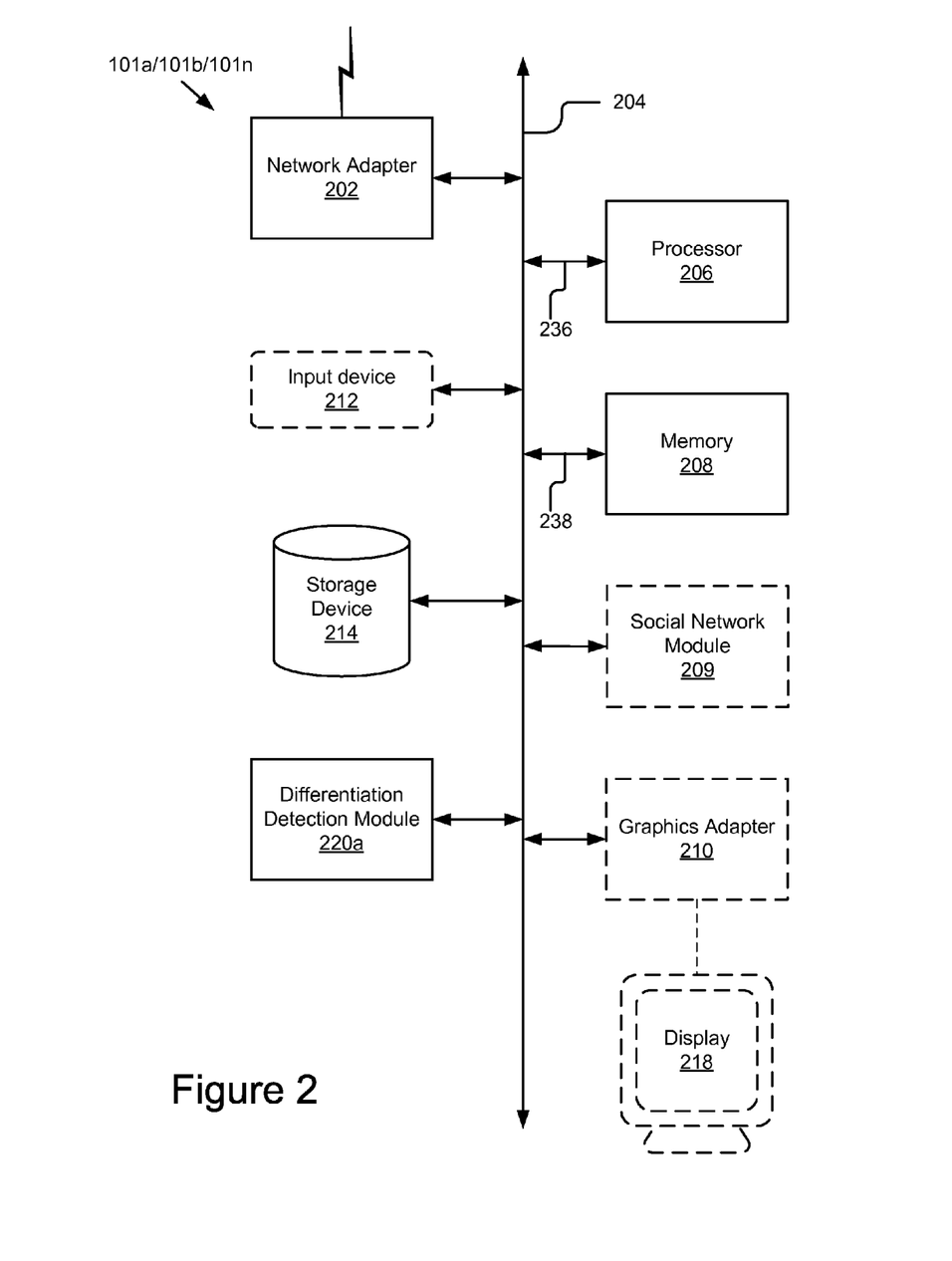
FIG. 2 is a block diagram of a social network server in accordance with one embodiment.

FIG. 2 is a block diagram of an embodiment of a social network server 101a/101b/101n. As illustrated in FIG. 2, the social network server 101a/101b/101n includes a network adapter 202 coupled to a bus 204. According to one embodiment, also coupled to the bus 204 are at least one processor 206, memory 208, a social network module 209, a graphics adapter 210, an input device 212, a storage device 214, and a differentiation detection module 220a. In one embodiment, the functionality of the bus 204 is provided by an interconnecting chipset. In one embodiment, the social network server 101a/101b/101n also includes a display 218, which is coupled to the graphics adapter 210.

The processor 206 may be any general-purpose processor. The processor 206 comprises an arithmetic logic unit, a microprocessor, a general purpose controller or some other processor array to perform computations, provide electronic display signals to display 218. The processor 206 is coupled to the bus 204 for communication with the other components of the social network server 101a/101b/101n. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The social network server 101a/101b/101n also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory such as a hard disk drive or flash drive for storing log information on a more permanent basis. The memory 208 is coupled by the bus 204 for communication with the other components of the social network server 101a/101b/101n. In one embodiment, the differentiation detection module 220a is stored in memory 208 and executable by the processor 206.

In one embodiment, the social network module 209 is software and routines executable by the processor 206 to control the interaction between the social network server 101a/101b/101n, storage device 214 and the user devices 115a, 115b, 115n. An embodiment of the social network module 209 allows users 125a, 125b, 125n of user devices 115a, 115b, 115n to perform social functions between other users 125a, 125b, 125n of user devices 115a, 115b, 115n within the system 100.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 is used to store user profiles and other information identifying users 125a, 125b, 125n of the social network 101a/101b/101n. In some embodiments, such user data is stored in data storage 110a/110b/110n.

The input device 212 may include a mouse, track ball, or other type of pointing device to input data into the social network server 101a. The input device 212 may also include a keyboard, such as a QWERTY keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the social network server 101a/101b/101n to a local or wide area network.

The differentiation detection module 220a is software and routines executable by the processor 206 to notify a first social network user when one or more of the user's privacy settings differ from the user's privacy settings of at least one other social network. Details describing the functionality and components of the differentiation detection module 220a are explained in further detail below with regard to FIG. 3.

As is known in the art, a social network server 101a/101b/101n can have different and/or other components than those shown in FIG. 2. In addition, the social network server 101a can lack certain illustrated components. In one embodiment, a social network server 101a/101b/101n lacks an input device 212, graphics adapter 210, and/or display 218. Moreover, the storage device 214 can be local and/or remote from the social network server 101a/101b/101n (such as embodied within a storage area network (SAN)).

As is known in the art, the social network server 101a/101b/101n is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 214, loaded into the memory 208, and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Differentiation Detection Module 220a

Figure 3:
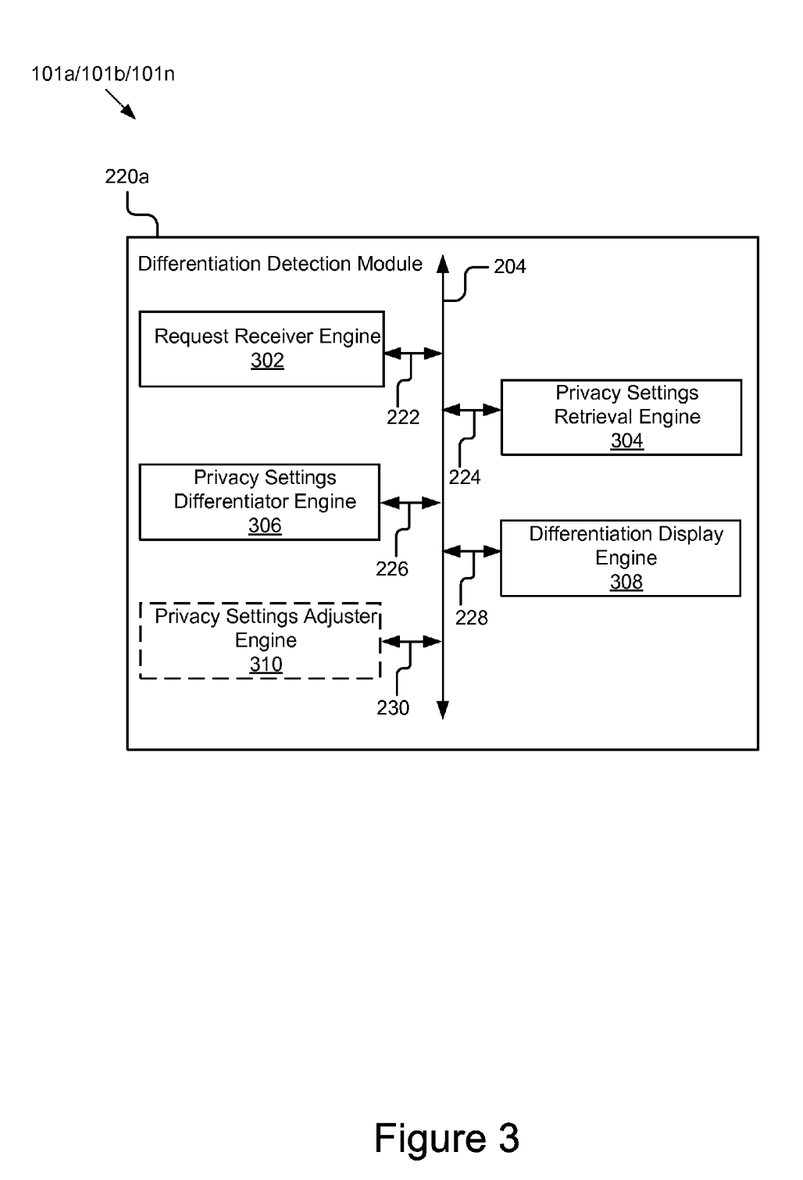
FIG. 3 is a block diagram illustrating a differentiation detection module according to one embodiment.

Referring now to FIG. 3, the differentiation detection module 220a is shown in more detail. FIG. 3 is a block diagram of a portion of the social network server 101a/101b/101n that includes the differentiation detection module 220a, a processor 206 and a memory 208, along with other modules and components recited in the description of FIG. 2. In one embodiment, the third party application server 107 includes the differentiation detection module 220b. In one embodiment, the differentiation detection module 220a is software and routines executable by the processor 206 to notify a first social network user when one or more of the user's privacy settings differ from the user's privacy settings of at least one other social network. For the purposes of describing the components and functionality of the differentiation detection module 220a/220b, the below description describes the differentiation detection module 220a. However, one of ordinary skill in the art will appreciate that the same description is also applicable to the functionality and components of the differentiation detection module 220b. Also for the purposes of describing the components and functionality of the differentiation detection module 220a, the below description describes the differentiating behavior authentication module 220a where the user's first social network is represented by social network server 101a and each social network server 101a, 101b, and 101n represents a different social network. However, one of ordinary skill in the art will appreciate that the same description is also applicable to the functionality and components of the differentiation detection module 220a of 110b, 110n and 107 as long as one or more social network servers associated with two or more social networks are present.

In one embodiment, the differentiation detection module 220a comprises a request receiver engine 302, a privacy settings retrieval engine 304, a privacy settings differentiator engine 306, and a differentiation display engine 308. In one embodiment, the differentiation detection module also includes an optional privacy settings adjustment engine 310.

The request receiver engine 302 is software and routines executable by the processor for receiving a request for access to information on a social network, wherein the information includes privacy settings information of a user and notify the user when one or more of the user's privacy settings of the first social network 101a differ from the user's privacy settings of the at least one other social network 101b, 101n. In one embodiment, the request receiver engine 302 is a set of instructions executable by the processor 206 to provide the functionality described below for receiving a request for access to information on a social network, wherein the information includes privacy settings information of a user and notify the user when one or more of the user's privacy settings of the first social network 101a differ from the user's privacy settings of the at least one other social network 101b, 101n. In another embodiment, the request receiver engine 302 is stored in the memory 208 of the social network server 101a/101b/101n and is accessible and executable by the processor 206. In either embodiment, the request receiver engine 302 is adapted for cooperation and communication with the processor 206 and other components of the social network server 101a/101b/101n via signal line 222.

In one embodiment, the request received by the request receiver engine 302 to notify the user when one or more of the user's privacy settings of the first social network 101a differ from the user's privacy settings of the at least one other social network 101b, 101n is the user's login request, i.e., the user, by logging into the first social network 101a, automatically requests to be notified when one or more of the user's privacy settings of the first social network 101a differ from the user's privacy settings of the at least one other social network 101b, 101n. In one embodiment, the user's request to edit the user's privacy settings of the first social network 101a is the request received by the request receiver 302, i.e., the user, by changing one or more privacy settings of the first social network, automatically requests to be notified when one or more of the user's privacy settings of the first social network 101a differ from the user's privacy settings of the at least one other social network 101b, 101n. In one embodiment, the user can request to be notified when one or more of the user's privacy settings of the first social network 101a differ from the user's privacy settings of the at least one other social network 101b, 101n by clicking on a button or hypertext link, which is received by the request receiver engine 302.

The privacy settings retrieval engine 304 is software and routines executable by the processor for receiving the user's privacy settings data from the first social network 101a and from at least one other social network 101b, 101n to which the user belongs and sending that data to the privacy settings differentiator engine 306. In one embodiment, the privacy settings retrieval engine 304 is a set of instructions executable by the processor 206 to provide the functionality described below for receiving the user's privacy settings data from the first social network 101a and from at least one other social network 101b, 101n to which the user belongs and sending that data to the privacy settings differentiator engine 306. In another embodiment, the privacy settings retrieval engine 304 is stored in the memory 208 of the social network server 101a/101b/101n and is accessible and executable by the processor 206. In either embodiment, the privacy settings retrieval engine 304 is adapted for cooperation and communication with the processor 206 and other components of the social network server 101a/101b/101n via signal line 224.

The privacy settings retrieval engine 304 is also communicatively coupled, via the differentiation detection module 220a of the each social network server 101a/101b/101n to other social network servers 101a, 101b, 101n. In one embodiment, the privacy settings retrieval engine 304 receives the user's privacy settings data from the storage device of one or more social networks 101a, 101b, 101n to which the user belongs. In one embodiment, the privacy settings retrieval engine 304 receives the user's privacy settings data associated with one or more social networks 101a, 101b, 101n to which the user belongs.

The privacy settings differentiator engine 306 is software and routines executable by the processor for receiving the privacy settings data received by the privacy settings retrieval engine 304, comparing the privacy settings of the first social network 101a and the privacy settings of at least one other social network 101b, 101n, and detecting differences. In one embodiment, the privacy settings differentiator engine 306 is a set of instructions executable by the processor 206 to provide the functionality described below for receiving the privacy settings received by the privacy settings retrieval engine 304, comparing the privacy settings of the first social network 101a and privacy settings of the at least one other social network 101b, 101n, and detecting differences. In another embodiment, the privacy settings differentiator engine 306 is stored in the memory 208 of the social network server 101a/101b/101n and is accessible and executable by the processor 206. In either embodiment, the privacy settings differentiator engine 306 is adapted for cooperation and communication with the processor 206 and other components of the social network server 101a/101b/101n via signal line 226.

In one embodiment, the privacy settings differentiator engine 306 also determines equivalent privacy settings among the first set of privacy settings and second set of privacy settings, wherein the equivalent privacy settings are further compared to determine whether different privacy settings levels exist. For example, a privacy setting in one social network may be called "visibility" while an equivalent privacy setting in a second social network may be called "exposure." The privacy settings differentiator engine 306 determines that these two settings are equivalent and compares the two for differences.

In one embodiment, the privacy settings differentiator engine 306 compares the user's privacy settings of the first social network 101a to the user's privacy settings of the at least one other social network 101b, 101n until it detects a first difference then stops comparing and detecting. In another embodiment, the privacy settings differentiator engine 306 compares all the user's privacy settings of the first social network 101a to all the user's privacy settings of the at least one other social network 101b, 101n and detects all the differences. In one embodiment, a difference exists, or the privacy settings differ, when the privacy setting of the first social network 101a is less restrictive than the privacy setting of the at least one other social network 101b, 101n. In such an embodiment, the privacy settings differentiator engine 306 detects differences where the user's first social network's 101a privacy settings are less restrictive than the user's privacy settings of the at least one other social network 101b, 101n.

The differentiation display engine 308 is software and routines executable by the processor for notifying the user when one or more of the user's privacy settings of the first social network 101a differ from the user's privacy settings of at least one other social network 101b, 101n and sending that notification for display to the user. In one embodiment, the differentiation display engine 308 is a set of instructions executable by the processor 206 to provide the functionality described below for generating a notification when one or more of the user's privacy settings of the first social network 101a differ from the user's privacy settings of at least one other social network 101b, 101n and sending that notification for display to the user. In another embodiment, the differentiation display engine 308 is stored in the memory 208 of the social network server 101a/101b/101n and is accessible and executable by the processor 206. In either embodiment, the differentiation display engine 308 is adapted for cooperation and communication with the processor 206 and other components of the social network server 101a/101b/101n via signal line 228.

In one embodiment, the notification is a pop-up window. In one embodiment the notification is a banner. In another embodiment, the notification is an e-mail or message to the user. In one embodiment, the notification appears on the page where privacy settings are normally set or displayed. In another embodiment, the notification is another webpage. Other embodiments may use other forms of notification.

In one embodiment, the differentiation display engine 308 receives the results of the privacy settings differentiator engine 306, generates a notification based on those results, and sends that notification for display to the user. In one embodiment, when no difference is detected by the privacy settings differentiator engine 306, no notification is generated or sent for display to the user. In another embodiment, when no difference is detected, a notification is generated and sent to the user to notify the user that no difference was detected.

In one embodiment, when one or more differences are detected by the privacy settings differentiator engine 306, the differentiation display engine 308 generates a notification and sends the notification for display to the user. In one embodiment, the generated notification notifies the user that one or more of the user's privacy settings of the first social network 101a differ from the user's privacy settings of the at least one other social network 101b, 101n. For example, "Warning! This social network has different privacy settings than your other social network." In one embodiment, the generated notification notifies the user that one or more of the user's privacy settings of the first social network 101a are less restrictive than the user's privacy settings of at least one other social network 101b, 101n. For example, "Warning! This social network has less restrictive privacy settings than your other social network; therefore, you may be sharing more information on this social network than you desire."

In one embodiment, the generated notification includes information about which user privacy settings of the first social network 101a differ from the user's privacy settings of at least one other social network 101b, 101n. For example, "Warning! This social network has different privacy settings for photographs than your other social network." In one embodiment, the generated notification includes information about which user privacy settings of the first social network 101a are less restrictive than the user's privacy settings of the at least one or more other social network 101b, 101n. For example, "Warning! This social network has less restrictive privacy settings for posts than your other social network; therefore, you may be sharing your posts on this social network with more users than you desire."

In one embodiment, the generated notification identifies the at least one other social network 101b, 101n that has privacy settings that differ from the user's privacy settings of the first social network 101a. For example, "Warning! This social network has different privacy settings than your Orkut account." In one embodiment, the generated notification identifies the at least one other social network 101b, 101n that have more restrictive privacy settings than the user's privacy settings of the first social network 101a. For example, "Warning! This social network has less restrictive privacy settings than your Orkut profile."

In one embodiment, the generated notification includes, for one or more of the privacy settings that differ, what the user's privacy settings of the first social network 101a and of the at least one other social network 101b, 101n are. For example, "Warning! Photographs on this social network are viewable by the public, while your photographs on Orkut are viewable only by your friends." In one embodiment, the notification gives the user the option to view the user's privacy settings of the user's first social network 101a. In one embodiment, the notification requests that the user confirm receipt of the notification in order for the notification to close, e.g., by clicking on a button. In one embodiment, the notification gives the user the option to adjust the user's privacy settings of the user's first social network 101a.

The privacy settings adjustment engine 310 is software and routines executable by the processor for adjusting one or more of the user's privacy settings of the first social network 101a. In one embodiment, the privacy settings adjustment engine 310 is a set of instructions executable by the processor 206 to provide the functionality described below for adjusting one or more of the user's privacy settings of the first social network 101a. In another embodiment, the privacy settings adjustment engine 310 is stored in the memory 208 of the social network server 101a/101b/101n and is accessible and executable by the processor 206. In either embodiment, the privacy settings adjustment engine 310 is adapted for cooperation and communication with the processor 206 and other components of the social network server 101a/101b/101n via signal line 230.

In one embodiment, the privacy settings adjustment engine 310 receives the user's request to adjust one or more privacy settings of the first social network 101a and links the user to the social network 101a page where privacy settings are normally adjusted. In one embodiment, the privacy settings adjustment engine 310 receives the user's request to adjust one or more privacy settings of the first social network 101a and updates the user's privacy settings in the storage device and/or data storage device 110a. In one embodiment, after the user adjusts one or more privacy settings of the first social network 101a, a request to notify the user when one or more of the user's privacy settings of the first social network 101a differ from the user's privacy settings of the at least one other social network 101b, 101n is sent.

Figure 5:
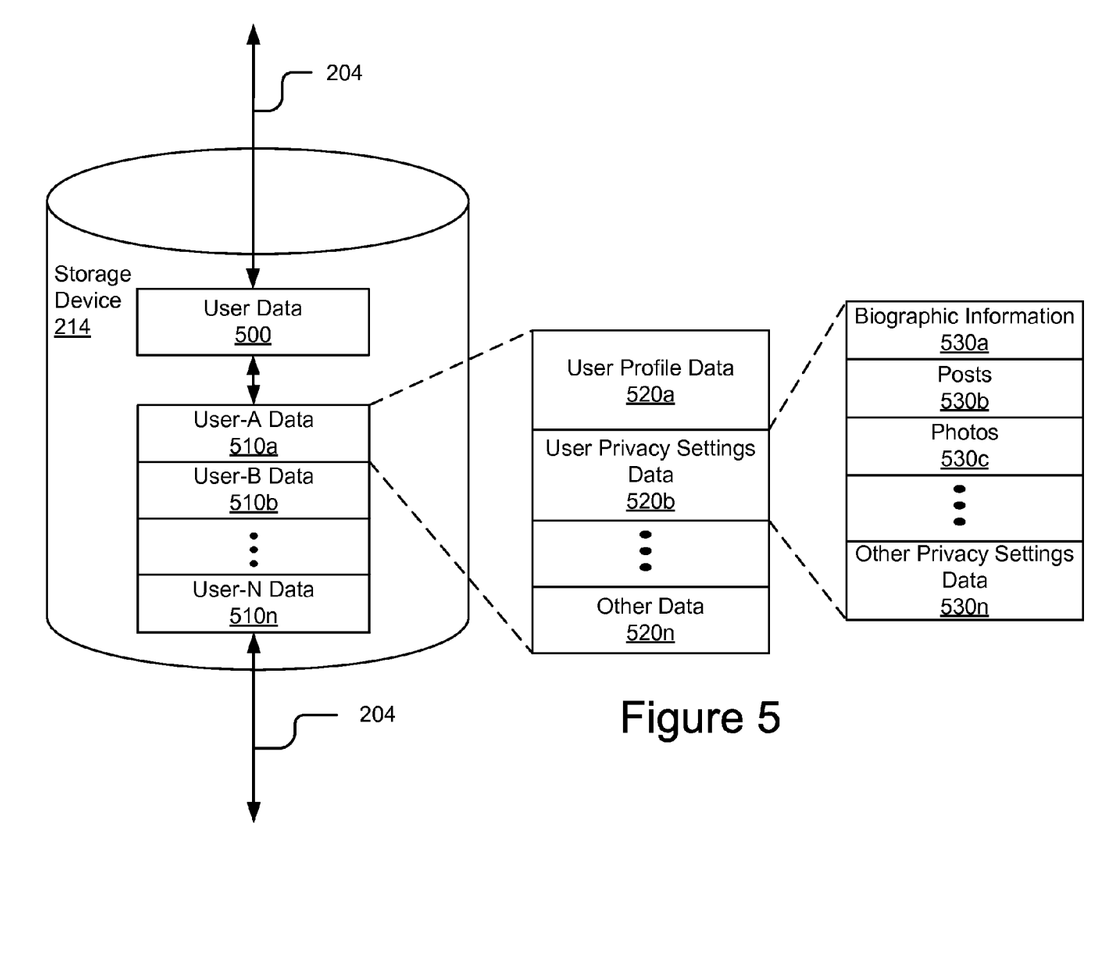
FIG. 5 illustrates a storage device storing user data including the user's privacy settings according to one embodiment.

FIG. 5 illustrates an example of a storage device 214 storing user data 500 including data belonging to User-A 510a according to one embodiment. In this example, the User-A data 510a includes data regarding the user's profile 520a, the user's privacy settings 520b, and other data 520n. In one embodiment, the user's privacy settings data 520b includes the privacy settings for the user's biographic information 530a, posts 530b, photos 530c, and other privacy settings data 530n.

Method

Figure 4:
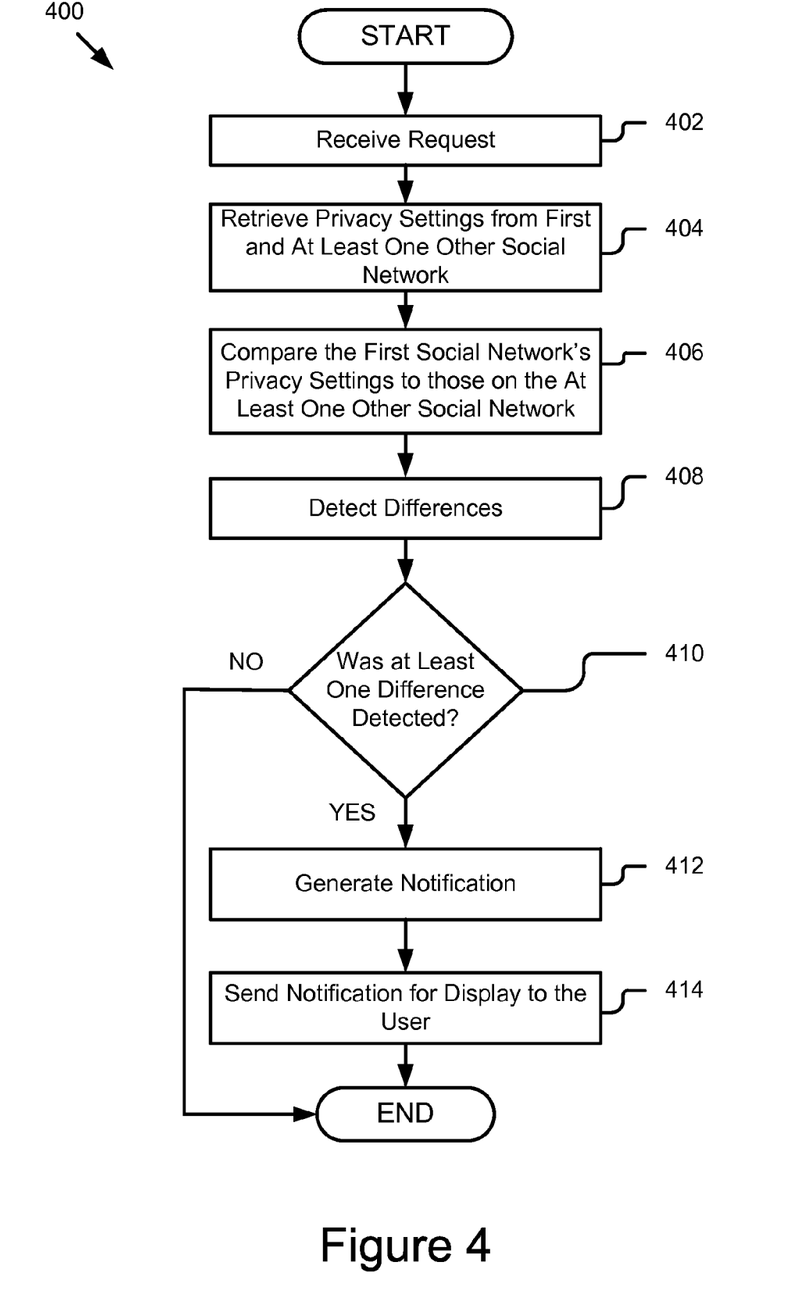
FIG. 4 is a flow chart illustrating a method for detecting and notifying a first social network user when one or more of the user's privacy settings differ from the user's privacy settings of at least one other social network according to one embodiment.

Referring now to FIG. 4, a flow chart illustrating an embodiment of a method 400 for notifying a first social network user when one or more the user's privacy settings of the first social network 101a differ from the user's privacy settings of at least one other social network 101b, 101n is shown.

The request receiver engine 302 of the differentiation detection module 220a receives 402 a request to notify the first social network user when one or more the user's privacy settings of the first social network 101a differ from the user's privacy settings of the at least one other social network 101b, 101n. As discussed above, in one embodiment the request received 402 is a login request. In another embodiment, the request received 402 is a request to edit the user's privacy settings of the first social network 101a. In yet another embodiment, the request received 402 is the user selecting a button or hypertext link for requesting a notification when one or more the user's privacy settings of the first social network 101a differ from the user's privacy settings of the at least one other social network 101b, 101n.

The privacy settings retrieval engine 304 of the differentiation detection module 220a receives 404 the privacy settings from the user's first social network 101a and the user's privacy settings from at least one other social network 101b, 101n. As discussed above, in one embodiment, the data is received 404 from the storage device 214 of one or more of the social network servers 101a, 101b, 101n. In one embodiment, the data is received from the data storage 110a/110b/110n of one or more of the social network servers 101a, 101b, 101n.

The privacy settings differentiator engine 306 of the differentiation detection module 220a receives the privacy settings received by the privacy settings retrieval engine 304 then compares 406 the user's privacy settings on the first social network 101a to the user's privacy settings of the at least one other social network 101b, 101n and detects 408 one or more differences. In one embodiment, the privacy settings differentiator engine 306 also determines equivalent privacy settings among the first set of privacy settings and second set of privacy settings, wherein the equivalent privacy settings are further compared to determine whether different privacy settings levels exist. For example, a privacy setting in one social network may be called "visibility" while an equivalent privacy setting in a second social network may be called "exposure." The privacy settings differentiator engine 306 determines that these two settings are equivalent and compares the two for differences.

As discussed above, in one embodiment, the privacy settings differentiator engine 306 compares the user's privacy settings on the first social network 101a to the user's privacy settings of the at least one other social network 101b, 101n until it detects 408 a first difference then stops comparing 406 and detecting 408. In another embodiment, the privacy settings differentiator engine 306 compares 406 all the user's privacy settings on the first social network 101a to all the user's privacy settings of the at least one other social network 101b, 101n and detects 408 all the differences. In one embodiment, the privacy settings differentiator engine 306 detects 408 a difference only when the first social network's 101a privacy setting is less restrictive than the privacy setting of the at least one other social network 101b, 101n.

The differentiation display engine 308 of the differentiation detection module 220a generates 412 a notification based on any differences detected 408 by the privacy settings differentiator engine 306 and sends 414 the notification for display to the user. In one embodiment, when no difference is detected (410—No), no notification is generated or sent for display to the user. In another embodiment, when no difference is detected (410—No), a notification is generated and sent to the user to notify the user that no differences were detected (not shown).

In one embodiment, when one or more differences are detected (410—Yes), the differentiation display engine 308 generates (412) a notification and sends (410) the notification for display to the user. As discussed above, in one embodiment, the generated 412 notification notifies the user when one or more of the user's privacy settings on the first social network 101a differ from the user's privacy settings of the at least one other social network 101b, 101n. In one embodiment, the generated 412 notification includes information about which of the user's privacy settings on the first social network 101a differ from the user's privacy settings of the at least one other social network 101b, 101n. In one embodiment, the generated 412 notification identifies the at least one other social network 101b, 101n that has privacy settings that differ from those on the first social network 101a. In one embodiment, the generated 412 notification includes, for one or more of the privacy settings that differ, what the privacy settings are set to on the first social network 101a and the at least one other social network 101b, 101n.

As discussed above, in one embodiment, the notification gives the user the option to view the user's privacy settings of the user's first social network 101a by including a link to privacy settings page. In one embodiment, the notification gives the user the option to change the user's privacy settings fn the user's first social network 101a by including a link to a privacy settings editing page (see FIG. 6). In another embodiment, the notification gives the user the option to adjust the privacy settings of the first social network in the notification (not shown). In one embodiment, the notification requires user to confirm receipt of the notification in order for the notification to close (see FIG. 6).

As mentioned above, the notification may appear in any number of places including, but not limited to, an e-mail, a pop-up, a banner, a separate webpage, or where the privacy settings are typically set or displayed.

Graphical User Interface

Figure 6:
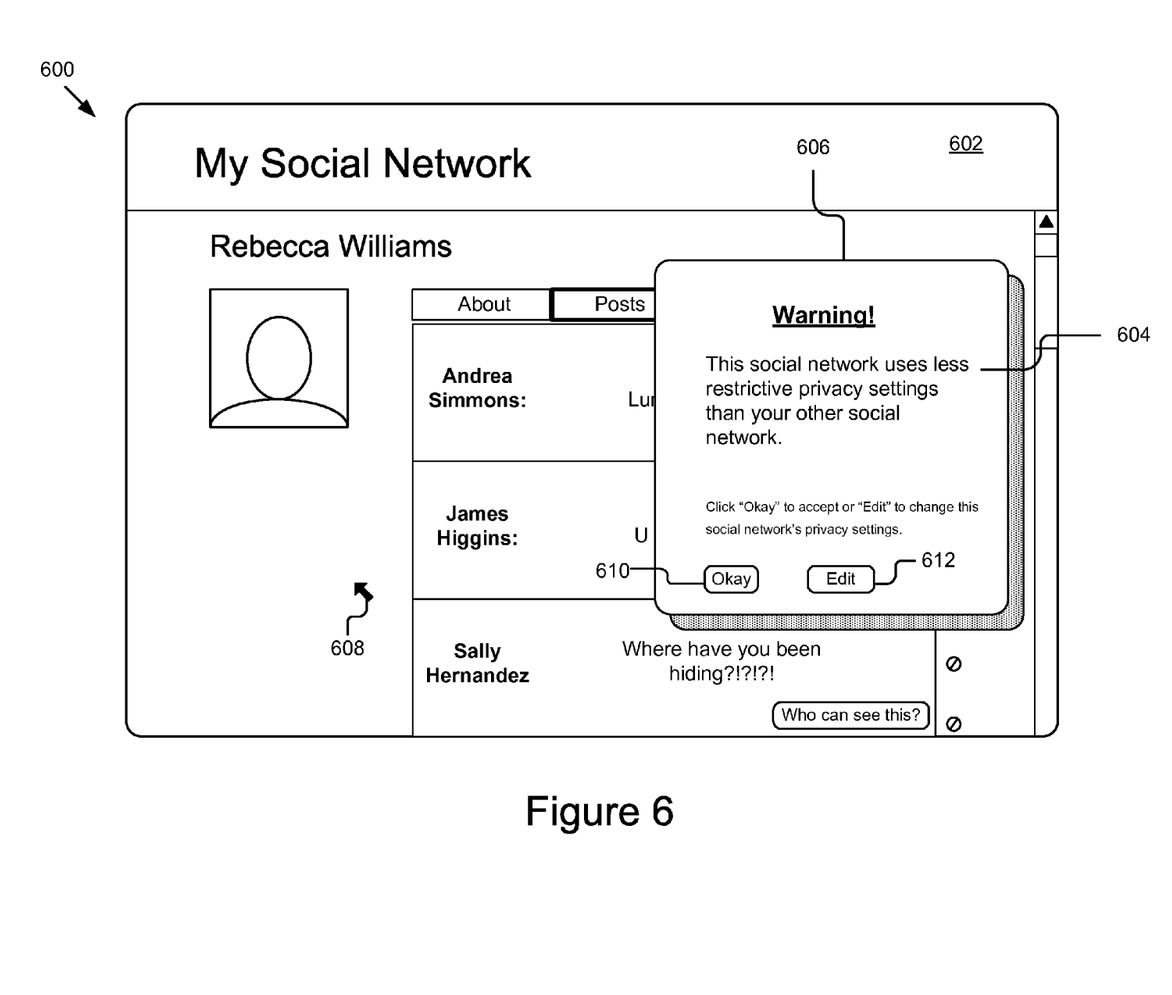
FIG. 6 is a graphic representation of an example of a user interface displaying a notification to the first social network user that one or more of the user's privacy settings differ from the user's privacy settings of at least one other social network according to one embodiment.

FIG. 6 is a graphic representation of an example of a user interface 600 displaying a user's social networking page 602. In one embodiment, the notification 604 appears in a pop-up window 606. In the illustrated example, the notification 604 notifies the first social network user that the user's first social network uses less restrictive privacy settings than the user's other social network 101b/101n; however, as previously discussed, the notification 604 can contain different/other information. According to one embodiment, the notification requires user to confirm the receipt of the notification 604 by using the user input device 608 to select a confirmation button 610. According to one embodiment, the notification 604 gives the user the option to edit the user's privacy settings by linking them to the privacy settings edit page, which is accomplished by the "Edit" button 612 in the illustrated embodiment.

FIG. 7 is a graphic representation of a user interface 700 displaying a notification 703 on a separate social networking page 702. In the illustrated embodiment, the notification 703 notifies the user that the first social network's 101a privacy settings differ from those on one or more of the user's other social networks 101b, 101n. As previously discussed, according to one embodiment, the notification 703 can include information about which privacy settings differ and what those settings are. In the illustrated embodiment, table 704 includes information about which privacy settings differ and what each of those settings is. Table 704 includes column 706, which contains the one or more features associated with privacy settings that differ between the user's first social network 101a and at least one other social network 101b, 101n according to one embodiment. Table 704, according to one embodiment, includes column 708, which contains the first social network's 101a privacy settings associated with each of the one or more features in column 706. Table 704, according to one embodiment, includes column 710, which contains the privacy settings associated with each of the one or more features in column 706 in a first different social network 101b/101n to which the user also belongs. Table 704, according to one embodiment, includes column 712, which contains the privacy settings associated with each of the one or more features in column 706 in a second different social network 101b/101n to which the user also belongs. In one embodiment, the user is notified which privacy settings are different and how those settings are different by reading across a row in table 704. For example, row 705 notifies the user that the privacy setting for the user's "First/Last Name" varies because the user's first social network has a privacy setting that makes that data and information public, "Other Social Network 1" has a different setting, and "Other Social Network 2's" privacy setting matches that of the first social network in one embodiment. In the illustrated example, box 714 is left empty. In one embodiment, a box is left empty when the privacy setting for that feature on that social network matches the privacy setting for that feature on the user's first social network.

The foregoing description of the embodiments has been presented for the purposes of illustration and description. It is not intended to be exhaustive or to limit the present embodiment to the precise forms disclosed. Many modifications and variations are possible in light of the above teaching. It is intended that the scope of the present embodiments be limited not by this detailed description, but rather by the claims of this application. As will be understood by those familiar with the art, the embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent to one of ordinary skill in the relevant art, the modules, routines, features, attributes, methodologies and other aspects of the embodiments can be implemented as software, hardware, firmware or any combination of the three. Also, wherever a component, an example of which is a module, is the component can be implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the embodiments are in no way limited to implementation in any specific programming language, or for any specific operating system or environment. Accordingly, the disclosure is intended to be illustrative, but not limiting, of the scope, which is set forth in the following claims.

What is claimed is:

1. A computer-implemented method for generating a notification of privacy settings difference, the method comprising:

receiving, using one or more processors, a request for access to information on a social network, wherein the information includes privacy settings information of a user;

receiving, using one or more processors, a first set of user privacy settings of the user from a first social network and a second set of privacy settings of the user from at least one other social network, wherein the first set of privacy settings of the user include user-defined accessibility to one or more features associated with the user of the first social network, and wherein the second set of privacy settings of the user include user-defined accessibility to one or more features associated with the user of the second social network;

comparing, using one or more processors, the first set of privacy settings to the second set of privacy settings;

detecting, using one or more processors, a difference between the first set of privacy settings and the second set of privacy settings;

responsive to detecting the difference between the first set of privacy settings and the second set of privacy settings, generating, using one or more processors, a notification, wherein the notification includes an indication that the difference has been detected; and sending, using one or more processors, the notification for display to the user.

2. The method of claim 1, wherein the request is the user's login request that is sent to the first social network.

3. The method of claim 1, wherein the request is the user's request to edit the first set of privacy settings.

4. The method of claim 1, wherein the request is the user selecting a button or hypertext link on the first social network.

5. The method of claim 1, wherein the difference exists when the privacy setting of the first set of privacy settings is less restrictive than the privacy setting of the second set of privacy settings.

6. The method of claim 1, wherein comparing the first set of privacy settings to the second set of privacy settings, further comprises:

determining equivalent privacy settings among the first set of privacy settings and second set of privacy settings, wherein the equivalent privacy settings are further compared to determine whether different privacy settings levels exist.

7. The method of claim 1, wherein the first set of privacy settings is compared to the second set of privacy settings until a subset of the privacy settings has been compared and the subset's differences detected.

8. The method of claim 1, wherein the notification is generated and sent responsive to detecting at least one privacy settings of the first social network that is less restrictive than the privacy setting of the at least one other social network.

9. The method of claim 1, wherein the notification identifies the at least one other social network having the detected difference from the first social network.

10. The method of claim 1, wherein the notification includes the detected difference between the first set of privacy settings and the second set of privacy settings.

11. The method of claim 1, wherein the notification allows the user to request to view, or edit, one or more of the privacy settings of the first social network.

12. The method of claim 11, the method further comprising:

receiving the user's request to view, or edit, the first set of privacy settings; and sending the user to a webpage on the first social network where the first set of privacy settings are typically displayed, or edited.

13. The method of claim 11, the method further comprising:

receiving the user's request to edit and one or more edits to the first set of privacy settings; and updating the first set of privacy settings according to the edits received from the user.

14. A system for generating a notification of privacy settings difference, the system comprising:

one or more processors;

a request receiver engine stored on a memory and executable by the one or more processors for receiving a request for access to information on a social network, wherein the information includes privacy settings information of a user;

a privacy settings retrieval engine for receiving a first set of privacy settings of a user from a first social network and a second set of privacy settings of the user from at least one other social network, wherein the first set of privacy settings of the user include user-defined accessibility to one or more features associated with the user of the first social network, and wherein the second set of privacy settings of the user include user-defined accessibility to one or more features associated with the user of the second social network;

a privacy settings differentiator engine for comparing the privacy settings of the first social network to the of the at least one other social network and detecting a difference between the first set of privacy settings and the second set of privacy settings;

a differentiation display engine for generating a notification responsive to the privacy settings differentiator engine detecting the difference between the first set of privacy settings and the second set of privacy settings, wherein the notification includes an indication that the difference has been detected and sending the notification for display to the user.

15. The system of claim 14, wherein the request is the user's login request that is sent to the first social network.

16. The system of claim 14, wherein the request is the user's request to edit one or more privacy settings of the first social network.

17. The system of claim 14, wherein the request is the user selecting a button or hypertext link on the first social network.

18. The system of claim 14, wherein the difference exists when the privacy setting of the first set of privacy settings is less restrictive than the privacy setting of the second set of privacy settings.

19. The system of claim 14, wherein comparing the first set of privacy settings to the second set of privacy settings, further comprises:

determining equivalent privacy settings among the first set of privacy settings and second set of privacy settings, wherein the equivalent privacy settings are further compared to determine whether different privacy settings levels exist.

20. The system of claim 14, wherein the first set of privacy settings is compared to the second set of privacy settings until a subset of the privacy settings have been compared and the differences detected.

21. The system of claim 14, wherein the notification is generated and sent responsive to detecting at least one privacy setting of the first social network that is less restrictive than the privacy setting of the at least one other social network.

22. The system of claim 14, wherein the notification identifies the at least one other social network having the detected difference from the first social network.

23. The system of claim 14, wherein the notification includes the detected difference between the first set of privacy settings and the second set of privacy settings.

24. The system of claim 14, wherein the notification allows the user to request to view, or edit, one or more of the privacy settings of the first social network.

25. The system of claim 24, the system further comprising:

a privacy settings adjustment engine for receiving the user's request to view, or edit, the privacy settings of the first social network; and sending the user to a webpage on the first social network where the privacy settings are typically displayed, or edited.

26. The system of claim 24, the system further comprising:

a privacy settings adjustment module for receiving the user's request to edit and one or more edits to the user's privacy settings of the first social network; and updating the privacy settings of the first social network according to the edits received from the user.

27. A computer program product comprising a computer usable non-transitory storage medium including a computer readable program, the computer readable program when executed by a processor causes the processor to:

receive a request for access to information on a social network, wherein the information includes privacy settings information of a user;

receive a first set of user privacy settings of a user from a first social network and a second set of privacy settings of the user from at least one other social network, wherein the first set of privacy settings of the user include user-defined accessibility to one or more features associated with the user of the first social network, and wherein the second set of privacy settings of the user include user-defined accessibility to one or more features associated with the user of the second social network;

compare the first set of privacy settings to the second set of privacy settings;

detect a difference between the first set of privacy settings and the second set of privacy settings;

responsive to detecting the difference between the first set of privacy settings and the second set of privacy settings, generate a notification, wherein the notification includes an indication that the difference has been detected; and send the notification for display to the user.

\* \* \* \* \*